US012485434B2

(12) United States Patent
Huang et al.

(10) Patent No.: US 12,485,434 B2
(45) Date of Patent: Dec. 2, 2025

(54) NOZZLE STRUCTURE, ADDITIVE DELIVERY DEVICE AND WASHING MACHINE

(71) Applicants: CHONGQING HAIER DRUM WASHING MACHINE CO., LTD., Chongqing (CN); HAIER SMART HOME CO., LTD., Shandong (CN)

(72) Inventors: Tao Huang, Shandong (CN); Bingheng Zhou, Shandong (CN); Huacheng Zhang, Shandong (CN)

(73) Assignees: CHONGQING HAIER DRUM WASHING MACHINE CO., LTD., Chongqing (CN); HAIER SMART HOME CO., LTD., Shandong (CN)

( * ) Notice: Subject to any disclaimer, the term of this patent is extended or adjusted under 35 U.S.C. 154(b) by 283 days.

(21) Appl. No.: 18/043,543

(22) PCT Filed: Aug. 9, 2021

(86) PCT No.: PCT/CN2021/111396
§ 371 (c)(1),
(2) Date: Feb. 28, 2023

(87) PCT Pub. No.: WO2022/042270
PCT Pub. Date: Mar. 3, 2022

(65) Prior Publication Data

US 2023/0347359 A1 Nov. 2, 2023

(30) Foreign Application Priority Data

Aug. 31, 2020 (CN) ......................... 202010897286.3
Sep. 4, 2020 (CN) ......................... 202010919601.8

(51) Int. Cl.
*D06F 39/08* (2006.01)
*B05B 1/06* (2006.01)
(Continued)

(52) U.S. Cl.
CPC ................ *B05B 1/06* (2013.01); *D06F 33/37* (2020.02); *D06F 39/022* (2013.01); *D06F 39/088* (2013.01); *D06F 2105/42* (2020.02)

(58) Field of Classification Search
None
See application file for complete search history.

(56) References Cited

U.S. PATENT DOCUMENTS 8,438,881 B2 † 5/2013 Ihne
2006/0143836 A1 * 7/2006 Jung .................... D06F 35/006 8/158

(Continued)

FOREIGN PATENT DOCUMENTS

CA 2031563 A1 6/1991
CN 101424037 A 5/2009

(Continued)

OTHER PUBLICATIONS

International Search Report (PCT/ISA/210) with translation and Written Opinion (PCT/ISA/237) mailed on Nov. 9, 2021, by the China Patent Office as the International Searching Authority for International Application No. PCT/CN2021/111396. 12 pages.

(Continued)

*Primary Examiner* — Cristi J Tate-Sims
(74) *Attorney, Agent, or Firm* — BUCHANAN, INGERSOLL & ROONEY PC

(57) ABSTRACT

An additive delivery device includes a water supply waterway; and a delivery unit to deliver additives to the water supply waterway; an outlet of the water supply waterway being connected to a nozzle structure. A washing machine includes an inner drum configured to hold a load and the additive delivery device. An inlet of the water supply waterway communicates with a water inlet pipe, and the nozzle structure of the additive delivery device jets an additive solution towards the inside of the inner drum of the
(Continued)

washing machine. Additives in the washing machine directly flow to the nozzle structure by the water supply waterway and are directly jetted into the inner drum by the nozzle structure without passing through a water box and an outer drum outside the inner drum, and then, onto the load in the inner drum to increase the utilization ratio of the additives.

17 Claims, 11 Drawing Sheets

(51) Int. Cl.

| | |
|---|---|
| ***D06F 33/37*** | (2020.01) |
| ***D06F 39/02*** | (2006.01) |
| *D06F 105/42* | (2020.01) |

(56) References Cited

U.S. PATENT DOCUMENTS

| | | | | |
|---|---|---|---|---|
| 2011/0099728 | A1 | 5/2011 | Kim et al. | |
| 2011/0154580 | A1* | 6/2011 | Kim | D06F 35/005 68/200 |
| 2011/0277515 | A1* | 11/2011 | Doh | D06F 39/08 68/17 R |
| 2020/0216998 | A1 | 7/2020 | Wright et al. | |
| 2021/0131018 | A1 | 5/2021 | Wright | |
| 2021/0238790 | A1 | 8/2021 | Huang et al. | |

FOREIGN PATENT DOCUMENTS

| | | | | |
|---|---|---|---|---|
| CN | 203803675 | U | | 9/2014 |
| CN | 207933733 | U | † | 10/2018 |
| CN | 208038837 | U | | 11/2018 |
| CN | 109112763 | A | | 1/2019 |
| CN | 109957935 | A | | 7/2019 |
| CN | 111118837 | A | | 5/2020 |
| CN | 111455630 | A | † | 7/2020 |
| CN | 212771554 | U | | 3/2021 |
| DE | 4427252 | A1 | | 2/1996 |
| GB | 732473 | A | | 6/1955 |
| JP | S51-64409 | U | | 5/1976 |
| JP | 2007155170 | A | | 6/2007 |
| JP | 2013-509281 | A | | 3/2013 |
| WO | 2019/201116 | A1 | | 10/2019 |
| WO | 2020/147770 | A1 | | 7/2020 |

OTHER PUBLICATIONS

Extended European Search Report issued on Jun. 18, 2024, in corresponding European Patent Application No. 21860109.4. (11 pages).

Office Action (Notice of Reasons for Refusal) issued on Mar. 5, 2024, in corresponding Japanese Patent Application No. 2023-514009 and English translation of the Office Action. (12 pages).

Office Action/Search Report (First Office Action) issued on Oct. 13, 2024, in corresponding Chinese Patent Application No. 202010897286.3 and English translation of the Office Action/Search Report. (22 pages).

Office Action/Search Report (First Office Action) issued on Oct. 26, 2024, in corresponding Chinese Patent Application No. 202010919601.8 and English translation of the Office Action/Search Report. (14 pages).

* cited by examiner
† cited by third party

NOZZLE STRUCTURE, ADDITIVE DELIVERY DEVICE AND WASHING MACHINE

TECHNICAL FIELD

The present disclosure belongs to the technical field of clothing treatment equipment, specifically relates to an additive delivery device for a washing machine, in particular to a nozzle structure for delivering an additive solution to a washing machine.

BACKGROUND

An existing washing machine is generally provided with an outer drum for holding washing water, a rotatable inner drum is disposed in the outer drum, and dehydration holes communicating with the inside and the outside are formed in the inner drum, so that the washing water flowing into the outer drum can mutually flow inside and outside the inner drum by the dehydration holes, and then, the effects that the washing water is in contact with a to-be-treated load delivered to the inner drum and the load is treated by using the washing water are achieved.

A way of delivering additives to the above-mentioned existing washing machine is shown as follows: additives are delivered, by an additive delivery device, to a pipeline communicating with the outer drum of the washing machine, and then, the delivered additives flow into the outer drum of the washing machine along the pipeline. Therefore, the additives delivered in an existing way are located inside the outer drum and outside the inner drum of the washing machine so as not to be in direct contact with the load delivered to the inner drum.

Then, when the washing machine performs a washing program, the delivered additives are mixed with the washing water flowing into the outer drum, and part of the washing water mixed with the additives flows into the inner drum by the dehydration holes and is in contact with the to-be-treated load in the drum, so that a small part of the additives mixed into the washing water is in contact with the load to act on the load. Therefore, there are problems including low use efficiency of the delivered additives and additive waste in a traditional additive delivery way.

At the same time, in a traditional additive delivery way, in order to ensure that the additives delivered between the outer drum and the inner drum are in contact with the to-be-treated load in the inner drum, a great deal of water needs to flow into the outer drum until the water level of the washing water in the outer drum is higher than that in the inner drum, and thus, the purposes that the washing water flows into the inner drum by the dehydration holes and the additives are in contact with the load in the inner drum are achieved. Therefore, there is still a problem of overmuch water for additive delivery in the traditional additive delivery way.

Besides, an existing additive delivery device is generally provided with a housing forming a water box, and the water box is connected in series to a water inlet pipe of the washing machine; and when inlet water of the washing machine flows through the water box after additives to be delivered flow into the water box by a waterway, the additives to be delivered in the water box are flushed out, the flushed additives to be delivered flow into the inside of the outer drum and the outside of the inner drum of the washing machine along with the inlet water, and thus, the purpose of delivering the additives is achieved.

However, there are problems in the additive delivery device with the above-mentioned structure:

1. the additives need to be delivered by using the water box, so that a delivery path of the additives is extended, and residues of the additives in the delivery path are increased, and the actual delivery quantity is reduced; and
2. the additives are flushed into the outer drum by the inlet water flowing through the water box; and since the section of the water box is larger than that of the waterway, the flow speed of a water flow flowing through the water box can be reduced, which easily causes the problem that the additives cannot be flushed in time by a water flow flowing through the additives and are remained in the water box.

To this end, the present disclosure is specially proposed.

SUMMARY

The technical problem to be solved by the present disclosure is to overcome defects in the prior art and provide an additive delivery device to achieve the purpose that additives are directly delivered outwards by a water supply waterway.

In order to achieve the above-mentioned inventive purpose, a technical solution adopted in the present disclosure is based on the basic conception:

the present disclosure provides an additive delivery device including a water supply waterway; and a delivery unit configured to deliver additives to the water supply waterway; an outlet of the water supply waterway being connected to a nozzle structure, and the nozzle structure jetting the additives supplied by the water supply waterway.

Further, the water supply waterway is integrated on a housing of the delivery device, the outlet of the water supply waterway is disposed on an outer side of the housing, the nozzle structure is disposed outside the housing, and the outlet of the water supply waterway communicates with the nozzle structure by a guide pipe.

Further, the top of the housing of the delivery device is an upper cover, the water supply waterway is disposed inside the upper cover, and the outlet of the water supply waterway is exposed on an outer circumferential side of the upper cover; and an independent guide pipe is disposed outside the housing, an inlet end of the guide pipe communicates with the outlet of the water supply waterway, and an outlet end of the guide pipe communicates with the nozzle structure disposed outside the housing; and preferably, the upper cover includes a first part and a second part which are buckled to each other, and the first part and the second part are oppositely spliced, and the water supply waterway is formed on a splicing surface.

Further, the delivery unit includes liquid storage cavities for storing the additives, and the liquid storage cavities communicate with the water supply waterway; and the delivery device is further provided with a power unit supplying power for pumping the additives in the liquid storage cavities into the water supply waterway.

Further, the power unit is a pump disposed on a flow channel connecting the liquid storage cavities to the water supply waterway and supplies a driving force for a liquid in the flow channel to flow from the liquid storage cavities to the water supply waterway;

and/or, the power unit is a suction pump, and a suction hole of the suction pump communicates with the water supply waterway, so that a negative pressure is formed in the water supply waterway to pump the additives in the liquid storage cavities into the water supply waterway by the flow channel;

and/or, the power unit is a Venturi pipe disposed on the water supply waterway, the Venturi pipe is provided with a negative pressure region where the negative pressure is formable by virtue of a water flow flowing through the region, and suction holes communicating with the liquid storage cavities by the flow channel are formed in the negative pressure region of the Venturi pipe.

Further, the additive delivery device includes the plurality of liquid storage cavities, and the delivery device is provided with a control device controlling one or a combination of the liquid storage cavities to communicate with the water supply waterway;

preferably, the liquid storage cavities respectively communicate with the water supply waterway by flow channels provided with control valves; and preferably, the liquid storage cavities communicate with different inlets of the same reversing valve in a one-to-one correspondence way, an outlet of the reversing valve communicates with the water supply waterway, and a rotatable valve element is disposed in the reversing valve to control any one or a combination of the inlets to communicate with the outlet.

Further, a liquid storage box is disposed in the housing of the delivery device, at least one liquid storage cavity for storing the additives is disposed in the liquid storage box, and the liquid storage cavities in the liquid storage box respectively communicate with the water supply waterway.

Further, the water supply waterway is provided with a liquid suction hole communicating with the delivery unit and allowing the additives to enter, the liquid suction hole is disposed close to the inlet of the water supply waterway, and a downstream part of the liquid suction hole of the water supply waterway is used for mixing the pumped additives and the inlet water.

Another purpose of the present disclosure is to provide a washing machine provided with the above-mentioned additive delivery device, so that the purpose of directly delivering additives into an inner drum is achieved, and then, the purpose of increasing the utilization ratio of a detergent by achieving the direct contact between the delivered detergent and the load to be treated in the inner drum is achieved.

In order to achieve the above-mentioned inventive purpose, a technical solution adopted in the present disclosure is based on the basic conception:

the present disclosure further discloses a washing machine including an inner drum configured to hold a to-be-treated load, the additive delivery device according to any one mentioned above, the inlet of the water supply waterway of the additive delivery device communicating with a water inlet pipe of the washing machine, and the nozzle structure of the additive delivery device jetting towards the inner drum of the washing machine.

Further, the nozzle structure is disposed on a housing, and/or a door body, and/or an outer drum, and/or a window pad of the washing machine, a jet outlet of the nozzle structure is disposed towards the inside of the inner drum, and an additive solution jetted by the nozzle structure is directly jetted into the inner drum.

Further, the nozzle structure connected to the outlet of the water supply waterway of the additive delivery device adopts the following nozzle structure.

Further, the jet outlet of the nozzle structure is disposed towards the inside of the inner drum. In the present disclosure, due to the above-mentioned arrangement, the washing machine provided with the above-mentioned additive delivery device can achieve the purpose that the additive solution formed by mixing the additives with a small deal of inlet water in the water supply waterway is directly jetted onto the to-be-treated load in the inner drum, and then, the utilization ratio of the delivered additives is significantly increased.

Further, the inner drum is sleeved in the outer drum, the outer drum and the inner drum are coaxially disposed and are provided with openings in the same side, and the opening of the outer drum is connected with the window pad protruding and extending towards the outside of the drum; and the nozzle structure is disposed on the window pad, the jet pipe of the nozzle structure passes through the window pad, the spray head is located on an inner circumferential side of the window pad, and an axis of the jet pipe is obliquely disposed downwards and towards one side inside the inner drum of the washing machine.

Further, the nozzle structure is disposed on the topmost of the annular window pad; and the axis of the jet pipe and an axis of the inner drum are located on the same plane, and an included angle between the axis of the jet pipe and the axis of the inner drum is 20 DEG to 60 DEG.

In the present disclosure, due to the above-mentioned arrangement, the additives are directly delivered outwards by the waterway disposed on the delivery device, and the additives are prevented from passing through a water box, so that not only are the flowing paths of the additives shortened, but also the quantity of flushing water required for additive delivery is reduced, and the utilization ratio of the additives is greatly increased. At the same time, the additive solution flowing out of the waterway is directly jetted by the nozzle structure, so that the coverage area of the jetted additive solution is increased, and the additive solution can be directly jetted onto the to-be-treated load deep in the inner drum.

After the above-mentioned technical solution is adopted, compared with the prior art, the present disclosure has the following beneficial effects:

1. In the present disclosure, due to the above-mentioned arrangement, the additives are directly delivered outwards by the waterway disposed on the delivery device, and the additives are prevented from passing through a water box, so that not only are the flowing paths of the additives shortened, but also the quantity of flushing water required for additive delivery is reduced, and the utilization ratio of the additives is greatly increased. At the same time, the additive solution flowing out of the waterway is directly jetted by the nozzle structure, so that the coverage area of the jetted additive solution is increased, and the additive solution can be directly jetted onto the to-be-treated load deep in the inner drum.
2. At the same time, in the present disclosure, the washing machine is provided with the above-mentioned additive delivery device, so that the additives in the washing machine directly flow to the nozzle structure by the water supply waterway and are directly jetted into the inner drum by the nozzle structure, then, the additives in the washing machine directly flow into the inner drum by the waterway of the delivery device and are jetted onto the to-be-treated load without passing through a water box and an outer drum outside the inner drum, and then, the purpose of directly jetting the additive solution onto the to-be-treated load in the inner drum is achieved.

3. Besides, due to the above-mentioned arrangement, the washing machine provided with the above-mentioned additive delivery device can achieve the purpose that the additive solution formed by mixing the additives with a small deal of inlet water in the water supply waterway is directly jetted onto the to-be-treated load in the inner drum, and then, the utilization ratio of the delivered additives is significantly increased.

At the same time, in order to increase the utilization ratio of the detergent, it is best to directly deliver the additives into the inner drum of the washing machine, so that the additives are in direct contact with a washing load in the inner drum. However, a tangential force of a water flow at the jet outlet of an existing nozzle structure is smaller, so that a dispersion distance of jetted outlet water is shorter, and the interior of the inner drum cannot be covered completely. Therefore, in order to solve the above-mentioned technical problems and overcome defects in the prior art, the present disclosure provides a nozzle structure to achieve the purpose of increasing the jet average area.

In order to achieve the above-mentioned inventive purpose, a technical solution adopted in the present disclosure is based on the basic conception:

the present disclosure provides a nozzle structure including a jet pipe, wherein an outlet end of the jet pipe is provided with a spray head, the spray head is provided with a jet outlet, and a flow channel by which water in the jet pipe is guided to the jet outlet and a tangential acceleration of a water flow at the jet outlet is increased is disposed in the spray head.

Further, a water outlet cavity is disposed in the spray head, a water outlet end of the jet pipe is provided with a connector outwards protruding and correspondingly inserted into the water outlet cavity, a gap forming the flow channel is formed between an outer wall of the connector and an inner wall of the water outlet cavity, and the flow channel is connected to the jet pipe by the connector and also directly communicates with the jet outlet.

Further, an insertion end of the connector is closed, the other end thereof communicates with the jet pipe, an outer side wall and the closed end of the connector are spaced from the inner wall of the water outlet cavity, the flow channel is formed on a spacing position, and a side wall, close to the closed end, of the connector is provided with a water hole by which a passage inside the connector communicates with the flow channel; and preferably, a plurality of water hole water holes are spaced in the side wall of the connector.

Further, a pipe diameter of an inner circumference of the jet pipe is larger than an internal diameter of the connector, the internal diameter of the connector is larger than a width of the water hole, and the width of the water hole is larger than a width of the flow channel; and preferably, a pore diameter of the jet outlet is smaller than the internal diameter of the connector and is larger than the width of the flow channel.

Further, the spray head includes an end cover, and the jet outlet is formed in the center of the end cover; an outer circumference of the end cover is provided with a circle of annular folding edge bent to the jet pipe and extending along an axial direction of the jet pipe, an extension end of the annular folding edge is connected to the water outlet end of the jet pipe in a sealing way, and the water outlet cavity is formed inside the annular folding edge;

preferably, an end of the annular folding edge is correspondingly fitted to an end surface of the outlet end of the jet pipe, and a fitting position is processed by using a cladding process so as to be connected in a sealing way; and preferably, the jet outlet is a circular hole of which a radial size is smaller than the internal diameter of the jet pipe.

Further, the outlet end of the jet pipe is provided with the connector correspondingly inserted into the water outlet cavity, and the connector and the jet pipe are coaxially disposed; a radial size of an outer circumference of the connector is larger than a pipe diameter of the outlet end of the jet pipe and is smaller than a diameter of an inner circumference of the annular folding edge, and a radial size of an inner circumference of the connector is smaller than the pipe diameter of the outlet end of the jet pipe, so that at least part of an end surface of the connector is superposed with an end surface of the outlet end of the jet pipe in an axial direction, a superposing position is correspondingly fitted and connected in a sealing way, and thus, the effect that water in the jet pipe can only flow into the water outlet cavity by the connector and is jetted by the jet outlet after being pressurized by the flow channel disposed in the water outlet cavity is achieved; and preferably, the connector and the jet pipe are integrally disposed.

After the above-mentioned technical solutions are adopted, the nozzle structure described in the present disclosure has the following beneficial effects:

due to the above-mentioned arrangement, the tangential acceleration of the water flow flowing towards the jet outlet in the nozzle structure can be increased, so that an outlet water flow at the jet outlet is dispersed around to achieve an effect that the water flow flowing out of the jet outlet of the nozzle structure is jetted in a shape of conical dispersion, and then, the significant technical progress of increasing the coverage area of the outlet water from the nozzle structure is achieved. More particularly, by using the above-mentioned nozzle structure, the jet area of the jetted additive solution can be increased, then, the additive solution delivered to the inner drum by the additive delivery device by virtue of the nozzle structure can be in sufficient contact with the load in the drum, and then, the significant technical progress of improving the washing effect of the washing machine is achieved.

At the same time, the present disclosure is simple in structure, significant in effect and suitable for popularization and application.

The specific implementations of the present disclosure will be further described in detail below in conjunction with accompanying drawings.

BRIEF DESCRIPTION OF THE DRAWINGS

The accompanying drawings serving as a part of the present disclosure are provided for further understanding the present disclosure. Exemplary embodiments of the present disclosure and their descriptions are intended to explain the present disclosure, rather than to constitute improper limitations on the present disclosure. Obviously, the accompanying drawings in the following description are merely some embodiments. Those of ordinary skill in the art can also obtain other accompanying drawings derived from these accompanying drawings without creative work. In the accompanying drawings.

DESCRIPTION FOR MAIN ELEMENTS IN THE DRAWINGS

Figure 1:
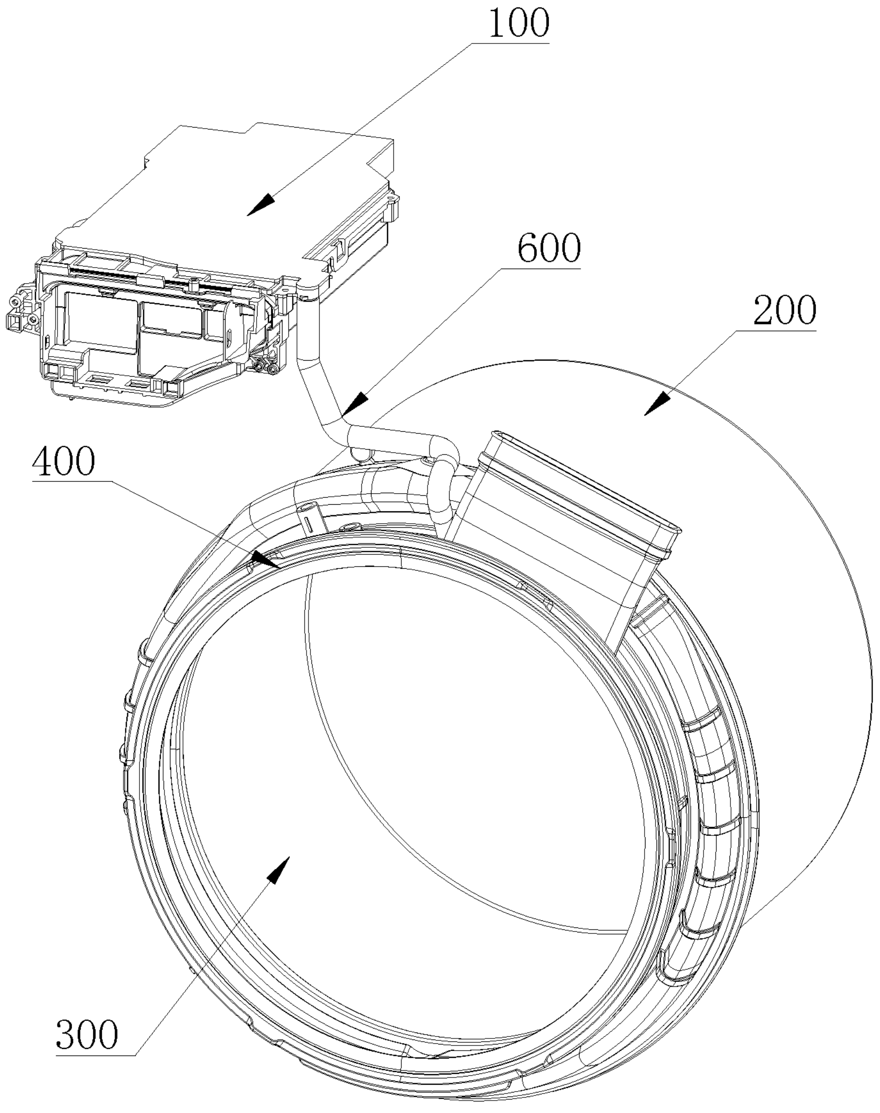
FIG. 1 to FIG. 3 are schematic structural views of a washing machine at different viewing angles in an embodiment of the present disclosure.
Figure 2:
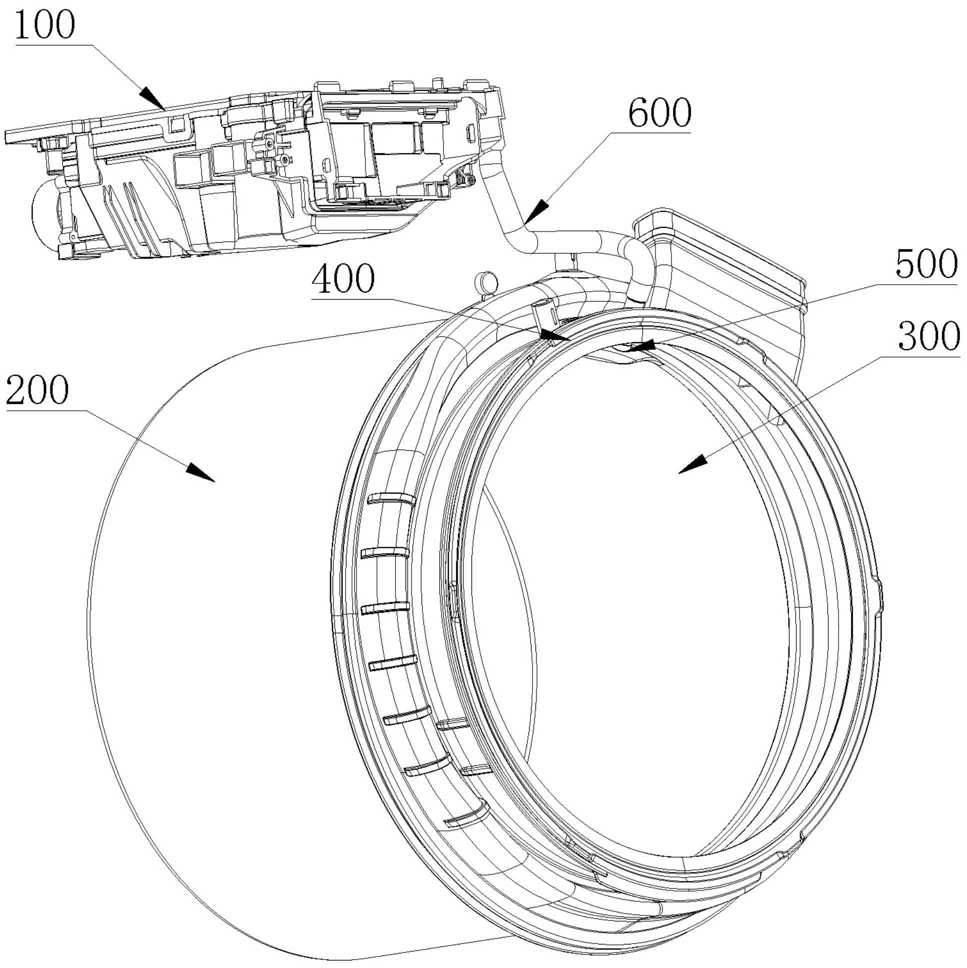
Figure 3:
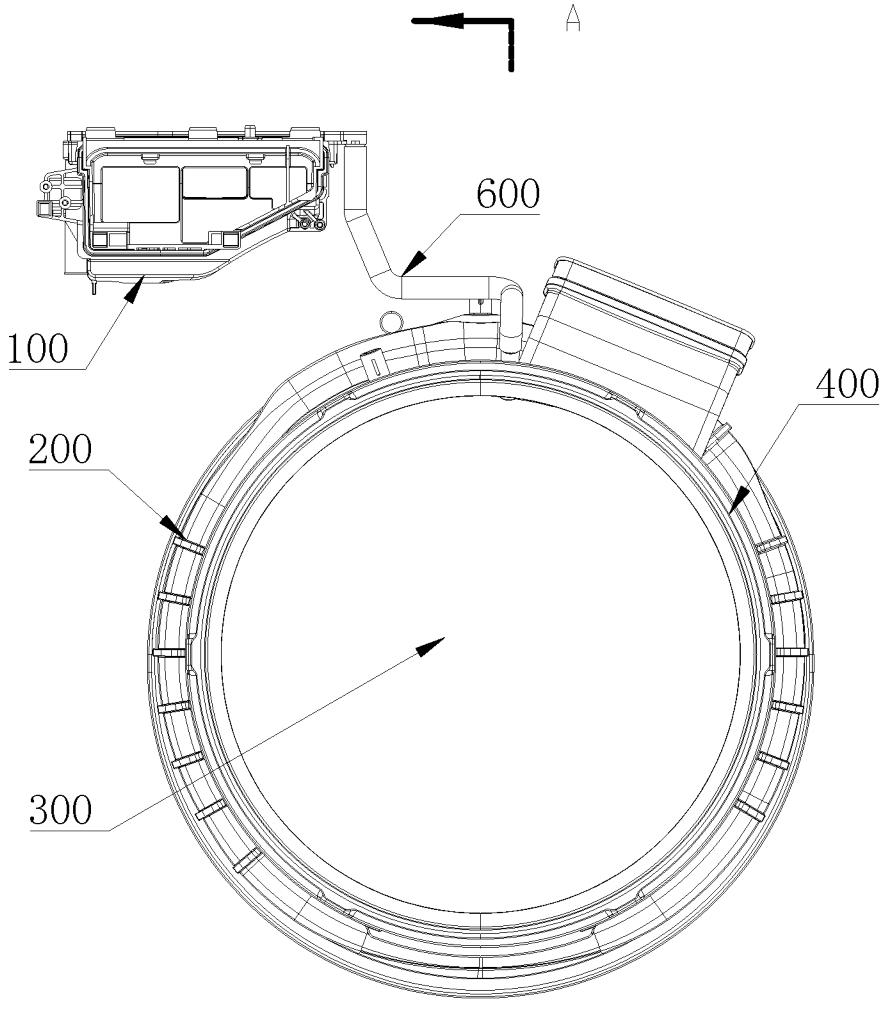
Figure 4:
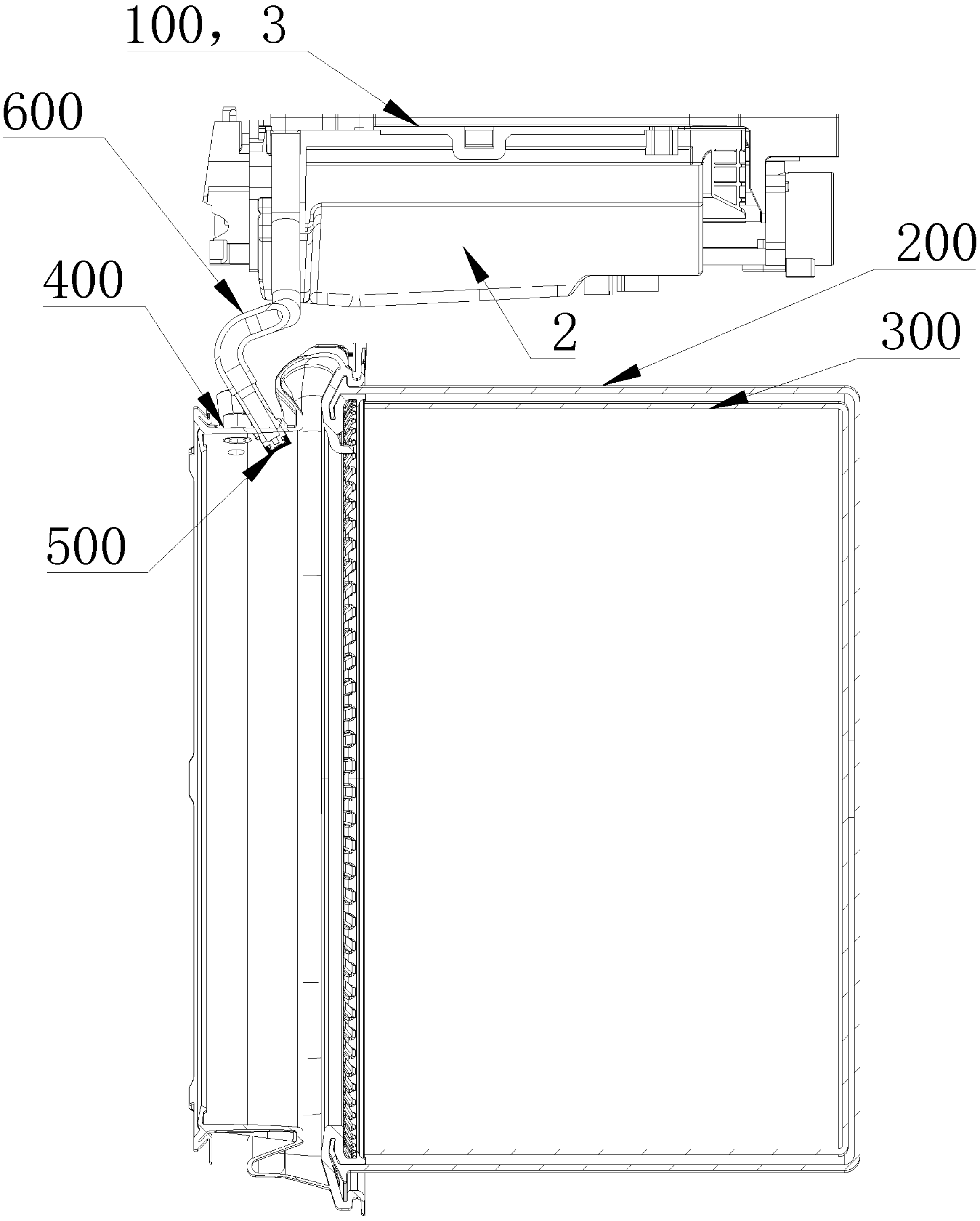
FIG. 4 is a schematic structural view of a section A-A in FIG. 3 in an embodiment of the present disclosure.
Figure 5:
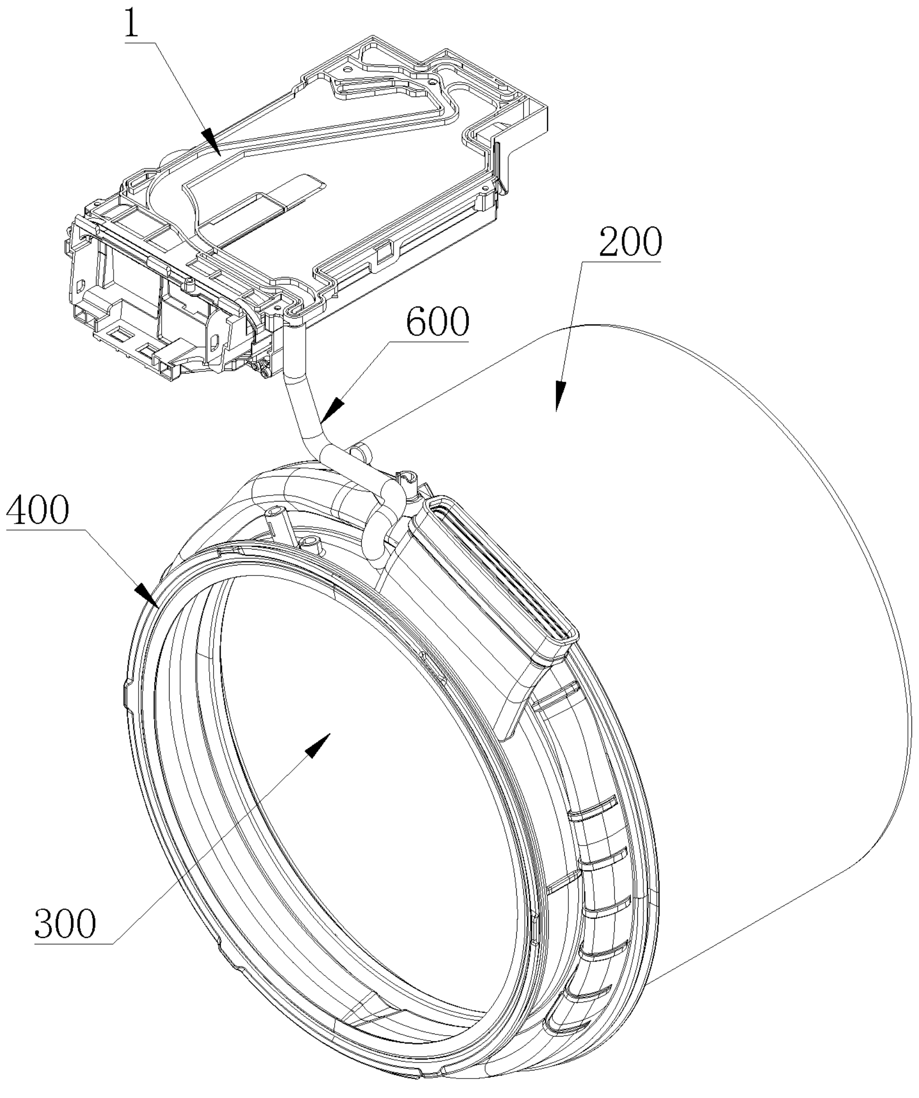
FIG. 5 is a schematic structural view of a washing machine with a first part of an upper cover being removed in an embodiment of the present disclosure.

100, delivery device; 200, outer drum; 300, inner drum; 400, window pad; 500, nozzle structure; 600, guide pipe; 1, water supply waterway; 2, housing; 3, upper cover; 31, first part; 32, second part; 4, liquid storage cavity; 5 liquid storage box; 6, pump; 7, communicating vessel; 8, liquid pumping flow channel; 11, outlet; 12, inlet; 13, liquid suction hole; 51, jet pipe; 52, spray head; 53, jet outlet; 54, water outlet cavity; 55, connector; 56, flow channel; 57, end cover; 58, annular folding edge; 59, water hole; 81, inlet; and 82, outlet.

It should be noted that these accompanying drawings and text descriptions are intended to explain the concept of the present disclosure for the skilled in the art with reference to specific embodiments, rather than to limit the conception scope of the present disclosure in any way.

DETAILED DESCRIPTION

In order to make objectives, technical solutions and advantages of the embodiments of the present disclosure clearer, the technical solutions in the embodiments will be described clearly and completely below in conjunction with accompanying drawings in the embodiments of the present disclosure. The following embodiments are intended to describe the present disclosure, rather than to limit the scope of the present disclosure.

In the description of the present disclosure, it should be noted that directional or positional relationships indicated by terms such as “upper”, “lower”, “front”, “rear”, “left”, “right”, “vertical”, “inner” and “outer” are directional or positional relationships based on the accompanying drawings, are merely intended to facilitate describing the present disclosure and simplifying the description, rather than to indicate or imply that the appointed device or element has to be located in a specific direction or structured and operated in the specific direction so as not to be understood as limitations on the present disclosure.

In the description of the present disclosure, it should be noted that terms “mounted”, “connected” and “connection” should be understood in a broad sense unless otherwise specified and defined, for example, “connection” may be fixed connection or detachable connection or an integrated connection, may be mechanical connection or electrical connection, and may be direct connection or indirect connection by an intermediate medium. For those of ordinary skill in the art, the specific meanings of the above terms in present disclosure may be understood according to specific situations.

As shown in FIG. 1 to FIG. 8, further introduced in an embodiment of the present disclosure is a washing machine including an outer drum 200 configured to hold water, a rotatable inner drum 300 mounted in the outer drum 200 and configured to hold a to-be-treated load, and an additive delivery device 100 configured to directly deliver additives to the inner drum 300. Due to the above-mentioned arrangement, the washing machine can achieve the use effect that the additives are directly delivered to the inner drum 300 and are directly jetted onto the to-be-treated load in the inner drum 300, and then, the significant technical progress of increasing the utilization ratio of the additives is achieved.

As shown in FIG. 1 to FIG. 8, the additive delivery device 100 in an embodiment of the present disclosure includes a water supply waterway 1 configured to allow inlet water entering the additive delivery device 100 to flow through; a delivery unit configured to deliver additives to the water supply waterway 1; and a nozzle structure 500, an outlet 11 of the water supply waterway 1 being connected to the nozzle structure 500, and the nozzle structure 500 being disposed towards the inside of the inner drum 300 of the washing machine. When the additives are delivered, a small deal of inlet water flows into the water supply waterway, so that the additives are mixed with the small deal of inlet water in the water supply waterway 1 to form an additive solution, and the additive solution supplied by the water supply waterway 1 may be directly jetted onto the to-be-treated load in the inner drum 300 by the nozzle structure 500, so that the utilization ratio of the delivered additives is remarkably increased.

Due to the above-mentioned arrangement, the additives are directly delivered outwards by the waterway disposed on the delivery device 100, and the additives are prevented from flowing through a water box, so that not only are the flowing paths of the additives shortened, but also the quantity of flushing water required for additive delivery is reduced, and the utilization ratio of the additives is greatly increased.

Embodiment 1

As shown in FIG. 1 to FIG. 12, introduced in the present embodiment is a nozzle structure including a jet pipe 51, wherein an outlet end of the jet pipe 51 is provided with a spray head 52, the spray head 52 is provided with a jet outlet 53, and a flow channel 56 by which water in the jet pipe 51 is guided to the jet outlet 53 and a tangential acceleration of a water flow at the jet outlet 53 is increased is disposed in the spray head 52.

Due to the above-mentioned arrangement, the tangential acceleration of the water flow flowing towards the jet outlet in the nozzle structure can be increased, so that an outlet water flow at the jet outlet is dispersed around to achieve an effect that the water flow flowing out of the jet outlet of the nozzle structure is jetted in a shape of conical dispersion, and then, the significant technical progress of increasing the coverage area of outlet water from the nozzle structure is achieved. More particularly, by using the above-mentioned nozzle structure, the jet area of the jetted additive solution can be increased, then, the additive solution delivered to the inner drum by the additive delivery device by virtue of the nozzle structure can be in sufficient contact with the load in the drum, and then, the significant technical progress of improving the washing effect of the washing machine is achieved.

As shown in FIG. 9 to FIG. 12, in the present embodiment, the spray head 52 is correspondingly buckled on the outlet end of the jet pipe 51, a position where the spray head 52 is in buckled connection with the jet pipe 51 is sealed by using a cladding process, so that the spray head 52 and the jet pipe 51 are connected into a whole by the cladding process, and the overall strength of the nozzle structure can be improved.

In the present embodiment, a water outlet cavity 54 is disposed in the spray head 52, a water outlet end of the jet pipe 51 is provided with a connector 55 outwards protruding and correspondingly inserted into the water outlet cavity, a gap forming the flow channel 56 is formed between an outer wall of the connector 55 and an inner wall of the water outlet cavity 54, and the flow channel 56 is connected to the jet pipe 51 by the connector 55 and also directly communicates with the jet outlet 53.

In the present embodiment, an insertion end of the connector 55 is closed, the other end thereof communicates with the jet pipe 51, an outer side wall and the closed end of the connector 55 are spaced from the inner wall of the water outlet cavity 54, and the flow channel 56 is formed on a spacing position, a side wall, close to the closed end, of the connector 55 is provided with a water hole 59 by which a passage inside the connector 55 communicates with the flow channel 56.

The outlet water flow from the nozzle structure flows into the waterway by the side wall of the connector, so that the outlet water flow can flow to the jet outlet by a flow channel part vertical to an axis of the jet outlet, the outlet water is prevented from directly flowing out along an axis of the jet pipe, and the effect that the tangential acceleration of the water flow at the jet outlet is increased is further achieved.

Preferably, in the present embodiment, in order to achieve the dispersion effect of the outlet water flow, the arrangement is made as follows: a plurality of water holes 59 are spaced in the side wall of the connector 55, and the adjacent water holes 59 are equidistantly disposed, so that water in the connector 55 can flow into the flow channel 56 by the water holes 59 in different directions, the effect that the water flows towards the jet outlet 52 in a plurality of different radial directions to increase the radial acceleration of the water flow in the different directions of the jet outlet 53 is improved, and then, the significant technical progresses of improving the dispersion degree of the outlet water flow from the jet outlet 53 and increasing the coverage area of the jetted outlet water are achieved.

In the present embodiment, a pipe diameter of an inner circumference of the jet pipe 51 is larger than an internal diameter of the connector 55, the internal diameter of the connector 55 is larger than a width of the water hole 59, and the width of the water hole 59 is larger than a width of the flow channel 56. Due to the above-mentioned arrangement, a radial width of the waterway inside the nozzle structure is gradually reduced, and a water flow flowing through each narrowing part is pressurized by using each narrowing part, so that the dispersion effect of the water flow at the jet outlet is further improved, and the jet coverage area is increased. In the present embodiment, the width of the flow channel 56 is a width of a section allowing the water flow to flow; the flow channel 56 is divided into two parts, a first part is a gap between an outer circumferential wall of the connector 55 and an inner circumferential wall of the water outlet cavity 54, and a distance of the above-mentioned gap in a radial direction of the jet pipe 51 is a width of the first part of the flow channel 56; and a second part is a gap between the closed end of the connector 55 and a lower end surface of the water outlet cavity 54, and a distance of the above-mentioned gap in an axial direction of the jet pipe 51 is a width of the second part of the flow channel 56.

In the present embodiment, a pore diameter of the jet outlet 53 is smaller than the internal diameter of the connector 55 and is larger than the width of the flow channel 56, so that it is ensured that the water flow flowing from the flow channel 56 to the jet outlet 53 can be radially dispersed to be jetted around from the jet outlet 53, and the effect that the outlet water flow in a shape of conical dispersion is jetted outwards from the jet outlet 53 is achieved.

In the present embodiment, the spray head 52 includes an end cover 57, and the jet outlet 53 is formed in the center of the end cover 57; an outer circumference of the end cover 57 is provided with a circle of annular folding edge 58 bent to the jet pipe 51 and extending along an axial direction of the jet pipe 51, an extension end of the annular folding edge 58 is connected to the water outlet end of the jet pipe 51 in a sealing way, and the water outlet cavity 54 is formed inside the annular folding edge 58.

In the present embodiment, an end of the annular folding edge 58 is correspondingly fitted to an end surface of the outlet end of the jet pipe 51, and a fitting position is processed by using a cladding process so as to be connected in a sealing way.

In the present embodiment, the jet outlet 53 is a circular hole of which a radial size is smaller than the internal diameter of the jet pipe 51, and the jet outlet 53 and the connector 55 are both disposed to be coaxial with the jet pipe 51.

In the present embodiment, the outlet end of the jet pipe 51 is provided with the connector 55 correspondingly inserted into the water outlet cavity 54, and the connector 55 and the jet pipe 51 are coaxially disposed; a radial size of an outer circumference of the connector 55 is larger than a pipe diameter of the outlet end of the jet pipe 51 and is smaller than a diameter of an inner circumference of the annular folding edge 58, and a radial size of an inner circumference of the connector 55 is smaller than the pipe diameter of the outlet end of the jet pipe 51, so that at least part of an end surface of the connector 55 is superposed with an end surface of the outlet end of the jet pipe 51 in an axial direction, a superposing position is correspondingly fitted and connected in a sealing way, and thus, the effect that water in the jet pipe 51 can only flow into the water outlet cavity 54 by the connector and is jetted by the jet outlet 53 after being pressurized by the flow channel 56 disposed in the water outlet cavity 54 is achieved.

Preferably, in the present embodiment, the connector 55 and the jet pipe 51 are integrally disposed.

Embodiment 2

As shown in FIG. 1 to FIG. 8, introduced in the present embodiment is an additive delivery device for a washing machine, including a water supply waterway 1; and a delivery unit configured to deliver additives to the water supply waterway 1; an outlet of the water supply waterway 1 being connected to any one nozzle structure 500 mentioned above, and the nozzle structure 500 jetting the additive solution supplied by the water supply waterway into the inner drum 300 of the washing machine.

In the present embodiment, the water supply waterway 1 is integrated on a housing 2 of the additive delivery device 100, the outlet 11 of the water supply waterway 1 is disposed on an outer side of the housing 2, the nozzle structure is disposed outside the housing 2, and the outlet 11 of the water supply waterway 1 communicates with the nozzle structure by a guide pipe 600. By integrating the water supply waterway 1 on the housing 2 of the additive delivery device 100 and directly connecting the outlet 11 of the water supply waterway 1 to the nozzle structure, additives pumped by the water supply waterway 1 and inlet water are jetted together, and then, the purpose that the additive delivery device 100 directly jets and delivers the additives outwards by the nozzle structure without passing through a water box part of the delivery device 100 is achieved.

Figure 7:
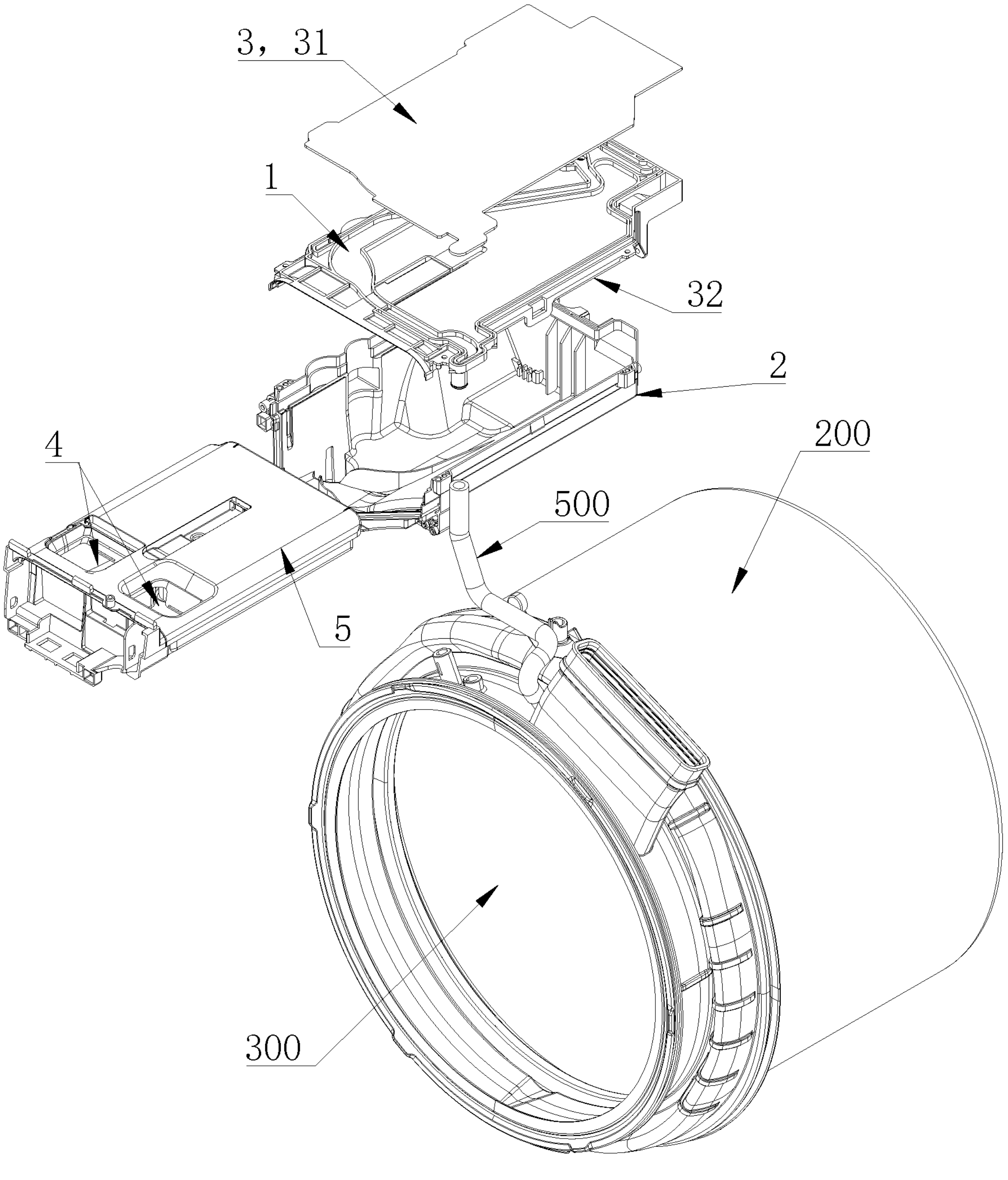
FIG. 7 and FIG. 8 are schematic structural views of a washing machine with an additive delivery device being exploded in an embodiment of the present disclosure.
Figure 8:
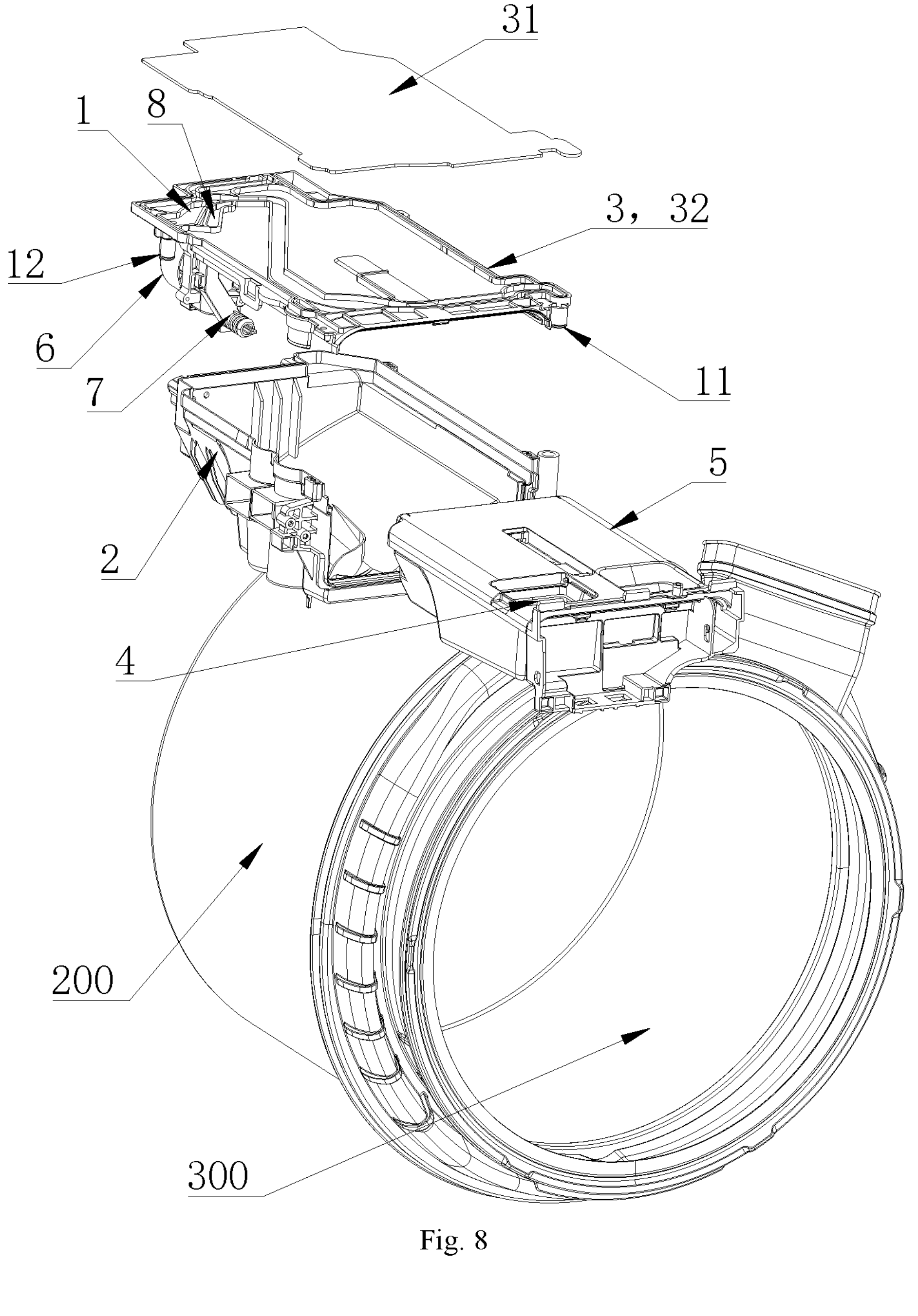
Figure 9:
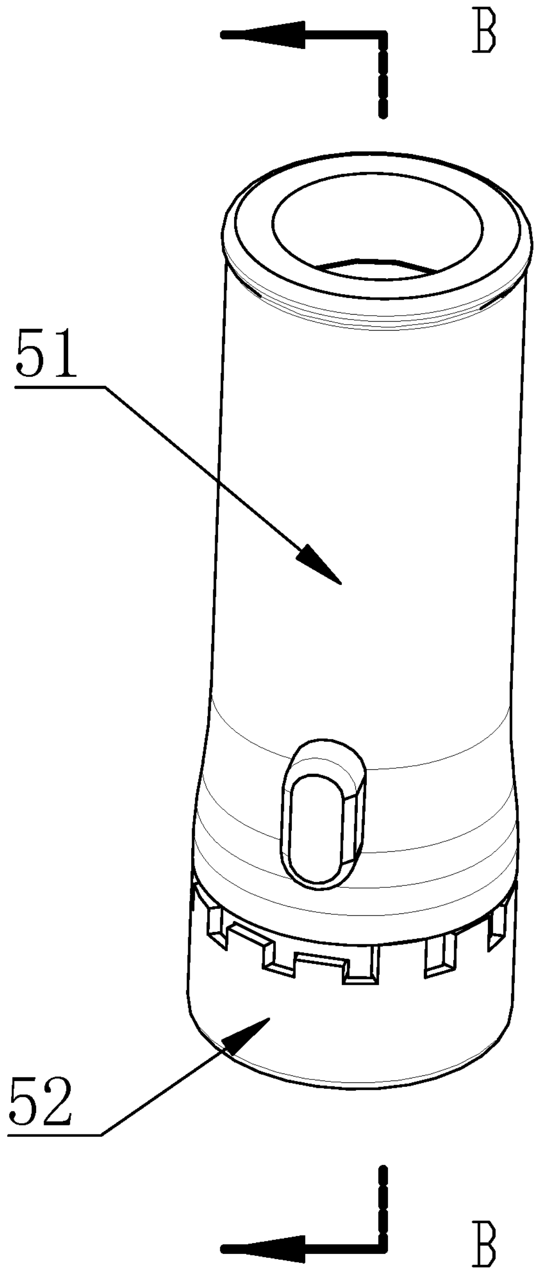
FIG. 9 is a schematic structural view of a nozzle structure in an embodiment of the present disclosure.
Figure 10:
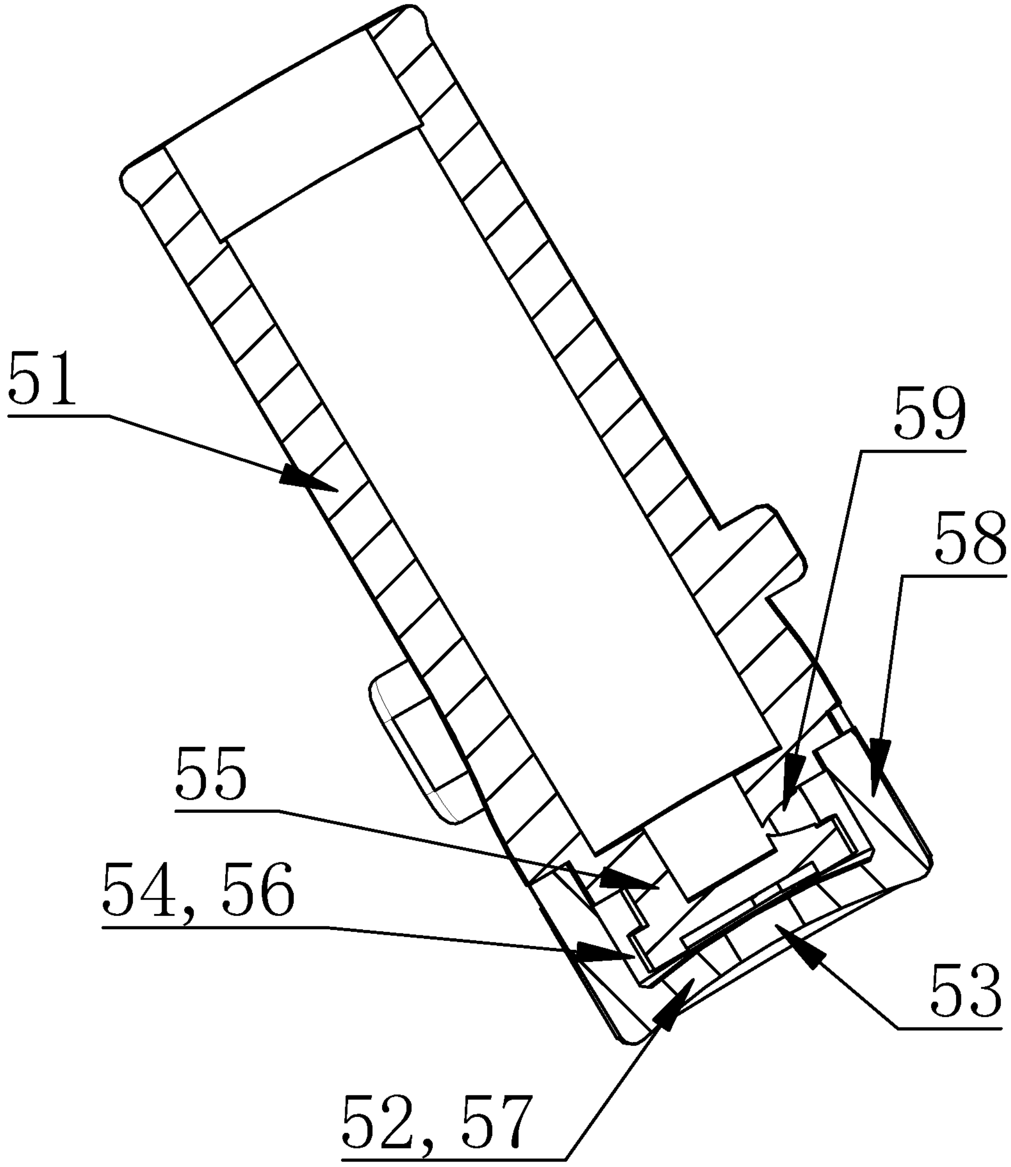
FIG. 10 is a schematic structural view of a section B-B in FIG. 9 in an embodiment of the present disclosure.
Figure 11:
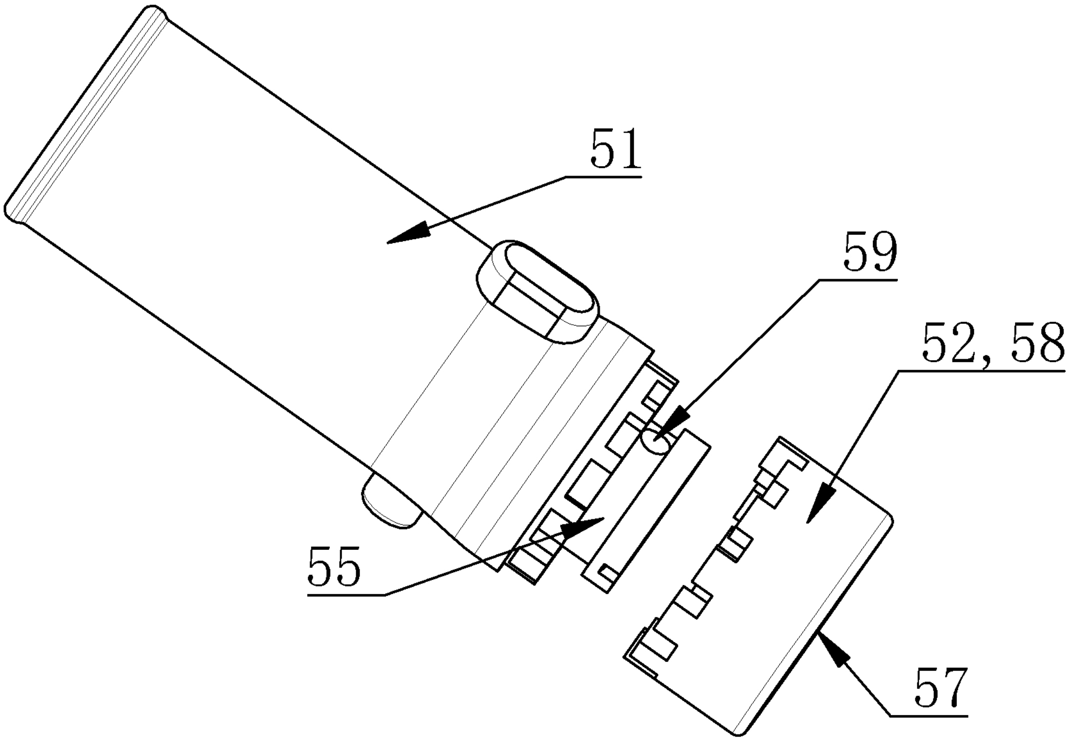
FIG. 11 and FIG. 12 are schematic views of an exploded structure of a nozzle structure at different viewing angles in an embodiment of the present disclosure.
Figure 12:
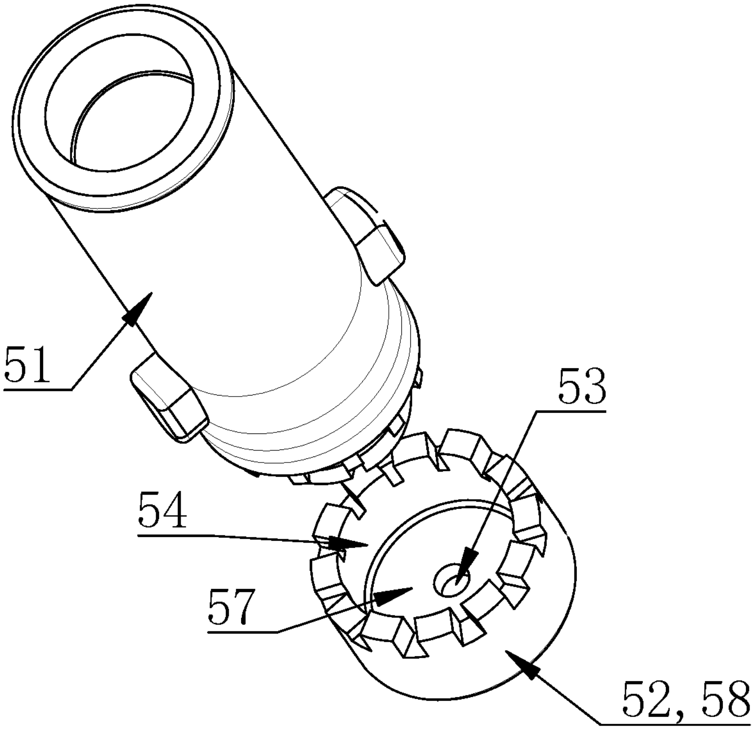

As shown in FIG. 7 and FIG. 8, in the present embodiment, the top of the housing 2 of the additive delivery device 100 is an upper cover 3, the water supply waterway 1 is disposed inside the upper cover 3, the outlet 11 of the water supply waterway 1 is exposed on an outer circumferential side of the upper cover 3, an inlet end of the guide pipe 600 communicates with the outlet 11 of the water supply waterway 1, and an outlet end of the guide pipe 600 communicates with the nozzle structure 500 disposed outside the housing 2. Preferably, the upper cover 3 includes a first part 31 and a second part 32 which are buckled to each other, and the first part 31 and the second part 32 are oppositely spliced, and the water supply waterway 1 is formed on a splicing surface. Further preferably, the first part 31 and the second part 32 of the upper cover 3 are connected by a cladding process so as to form a closed and pressure-bearable waterway structure inside.

Thus, the water supply waterway 1 of the additive delivery device 100 is integrated on the upper cover 3, so that the inlet water and the additives of the delivery device 100 are directly delivered by the water supply waterway 1 inside the upper cover 3, and then, the effect that the additives directly flow outwards through the outlet 11 in the outer circumferential side of the upper cover 3 so as to be delivered is achieved.

In the embodiment of the present disclosure, the delivery unit includes liquid storage cavities 4 for storing the additives, and the liquid storage cavities 4 communicate with the water supply waterway 1; and the delivery device 100 is further provided with a power unit supplying power for pumping the additives in the liquid storage cavities 4 into the water supply waterway.

As shown in FIG. 1 to FIG. 8, in the present embodiment, the power unit is a pump 6 disposed on a liquid pumping flow channel 8 connecting the liquid storage cavities 4 to the water supply waterway 1 and supplies a driving force for a liquid in the liquid pumping flow channel 8 to flow from the liquid storage cavities 4 to the water supply waterway 1. In the embodiment of the present disclosure, the liquid pumping flow channel 8 is also integrated inside the upper cover 3, an inlet 81 of the liquid pumping flow channel 8 communicates with the liquid storage cavities 4 by a communicating vessel 7, an outlet 82 of the liquid pumping flow channel 8 communicates with an inlet of the pump 6, and an outlet of the pump 6 communicates with a liquid suction hole 13 disposed in the water supply waterway 1. By controlling the starting or stopping of the pump 6, the purpose of pumping and delivering the additives in the liquid storage cavities 4 to the water supply waterway 1 is achieved.

In the embodiment of the present disclosure, the power unit may also be set to be of other existing structures. For example, the power unit is a suction pump, and a suction hole of the suction pump communicates with the water supply waterway 1, so that a negative pressure is formed in the water supply waterway 1 to pump the additives in the liquid storage cavities 4 into the water supply waterway 1 by the liquid pumping flow channel 8;

and/or, the power unit may also be a Venturi pipe disposed on the water supply waterway 1, the Venturi pipe is provided with a negative pressure region where a pipe diameter is suddenly changed and the negative pressure is formable here by virtue of a water flow flowing through the region, and suction holes communicating with the liquid storage cavities 4 by the liquid pumping flow channel 8 are formed in the negative pressure region (unshown in the accompanying drawings).

In the present embodiment, the additive delivery device 100 includes the plurality of liquid storage cavities 4, and each of the liquid storage cavities 4 may respectively hold different types of additives such as a detergent, a softener, a flavoring agent and a disinfectant; and the delivery device 100 is provided with a control device configured to control one or a combination of the liquid storage cavities 4 to communicate with the water supply waterway 1 so as to correspondingly deliver any one or various combinations of the additives into the water supply waterway 1 at the same time.

In the embodiment of the present disclosure, the control device may be set to be of any one of existing structures capable of achieving the above-mentioned function. For example:

in the embodiment of the present disclosure, the liquid storage cavities 4 may respectively communicate with the water supply waterway 1 by flow channels provided with control valves, so that the effect of controlling the connection or disconnection of any one or a combination of the flow channels is achieved by controlling the opening or closing of each of the control valves, and then, the purpose of independently delivering any one of the additives or delivering various types of additives at the same time is achieved;

or the liquid storage cavities 4 communicate with different inlets of the same reversing valve in a one-to-one correspondence way, an outlet of the reversing valve communicates with the water supply waterway 1, a rotatable valve element is disposed in the reversing valve to control any one or a combination of the inlets to communicate with the outlet, and thus, the purpose of independently delivering any one of the additives or delivering various types of additives at the same time can also be achieved (unshown in the accompanying drawings).

As shown in FIG. 1 to FIG. 8, in the present embodiment, a liquid storage box 5 is disposed in the housing 2 of the delivery device 100, and the liquid storage box 5 may be outwards pulled to be mounted in the housing 2 of the additive delivery device 100; and at least one liquid storage cavity 4 for storing the additives is disposed in the liquid storage box 5, and the liquid storage cavities 4 in the liquid storage box 5 respectively communicate with the water supply waterway 1 by the communicating vessel 7, and the communicating vessel 7 is provided with a control device configured to control any one or a combination of the liquid storage cavities 4 to communicate with the water supply waterway 1 in a way of controllable connection or disconnection.

In the present embodiment, an inlet 12 of the water supply waterway 1 is disposed in an outer wall of the housing 2 and communicates with a water inlet pipe of the washing machine, so that a washing inlet water can flow into the water supply waterway 1 by the inlet 12. The housing 2 of the additive delivery device 100 is provided with a water inlet connector of which two ends respectively communicate with the inlet 12 of the water supply waterway 1 and the water inlet pipe of the washing machine. Further preferably, the water inlet connector is provided with a control valve for controlling the connection or disconnection of the waterway.

Figure 6:
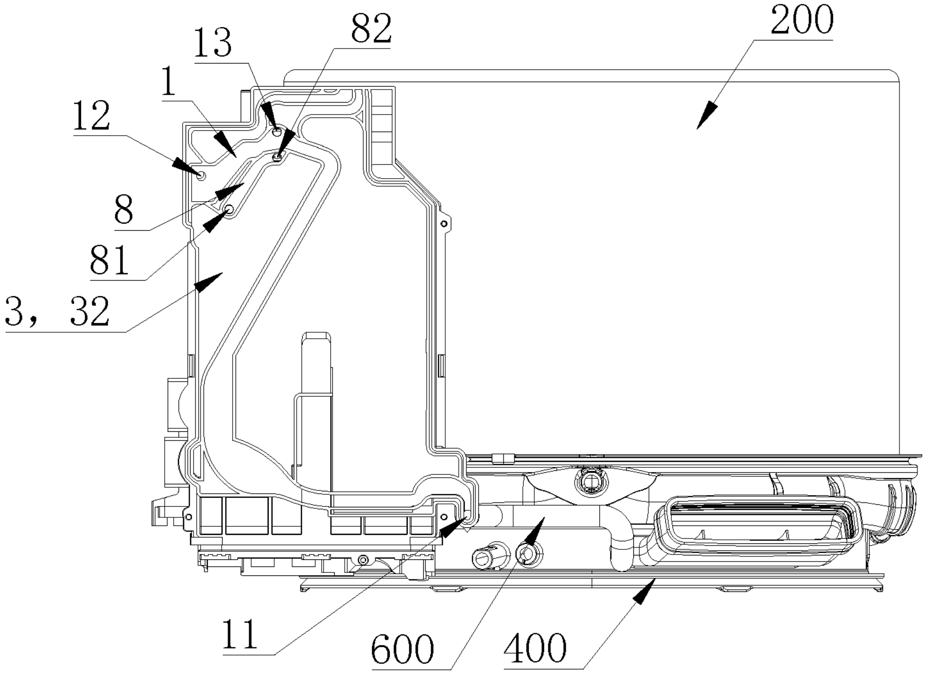
FIG. 6 is a schematic top view of a washing machine with a first part of an upper cover being removed in an embodiment of the present disclosure.

As shown in FIG. 6 to FIG. 8, in the present embodiment, the middle of the water supply waterway 1 is provided with a liquid suction hole 13 communicating with the delivery unit so that the additives are pumped into the water supply waterway 1 through the liquid suction hole 13. Preferably, the liquid suction hole 13 communicates with the outlet of the pump 6, the inlet of the pump 6 communicates with the outlet 82 of the liquid pumping flow channel 8, the inlet 81 of the liquid pumping flow channel 8 communicates with an outlet of the communicating vessel 7, and a plurality of inlets of the communicating vessel 7 communicate with the liquid storage cavities 4 in a one-to-one correspondence way, so that the purpose that the additives in the liquid storage cavities 4 are pumped into the water supply waterway 1 via the above-mentioned flow channel under the driving action of the pump 6 is achieved.

As shown in FIG. 6, in the present embodiment, the additives and the inlet water which flow into the water supply waterway 1 may be mixed by the water supply waterway 1 on the downstream of the liquid suction hole 13 to form an additive solution. Preferably, the liquid suction hole 13 is disposed close to the inlet 12 of the water supply waterway 1 to increase the length of the water supply waterway 1 on the downstream of the liquid suction hole 13 as much as possible, so that a space of a downstream part, where the additives and water are fixed, of the water supply waterway 1 is enlarged, and then, the mixing uniformity of the additives and the inlet water is improved.

Embodiment 3

As shown in FIG. 1 to FIG. 12, further introduced in the present embodiment is a washing machine provided with the above-mentioned additive delivery device 100 in embodiment 2. The washing machine includes an outer drum 200, an inner drum 300 of which an opening is disposed on the same side as that of the outer drum is sleeved in the outer drum 200, the opening of the outer drum 200 is connected with a window pad 400 protruding and extending towards the outside of the drum, the nozzle structure 500 is mounted at the window pad 400, and the jet outlet 53 of the nozzle structure 500 is located on an inner circumferential side of the window pad 400 and jets an additive solution towards the opening of the inner drum 300.

As shown in FIG. 1 to FIG. 8, the opening of the outer drum 200 is provided with a circle of window pad 400 which is cylindrical, one end of the cylindrical window pad 400 is connected to the opening of the outer drum 200, and the other end thereof is connected to the housing of the washing machine to form a passage; the opening of the inner drum 300 oppositely communicates with one end of the above-mentioned passage, the housing of the washing machine is provided with a clothing delivery port correspondingly communicating with the other end of the above-mentioned passage, the housing of the washing machine is provided with a door body capable of correspondingly opening or closing the clothing delivery port, and after the door body is closed, a sealed space is formed inside the outer drum 200; a gap space is formed between the door body and the window pad 400, and the gap space directly communicates with the inside of the inner drum 300 by the opening of the inner drum 300; the nozzle structure 500 is mounted on the top of the window pad 400, the nozzle structure 500 passes through the window pad 400, a part, located on the inner circumferential side of the window pad 400, of the nozzle structure 500 is provided with the jet outlet, a part located on an outer circumferential side of the window pad 400 is provided with an inlet, a flow channel is disposed inside the nozzle structure 500, two ends of the flow channel respectively communicates with the inlet and the jet outlet, and the jet outlet is disposed towards the opening of the inner drum 300, so that the additive solution jetted by the nozzle structure 500 may be directly jetted into the inner drum 300, and then, the significant technical progress of directly jetting the additives on a to-be-treated load in the inner drum 300 to increase the additive delivery efficiency is achieved.

In the embodiment of the present disclosure, the nozzle structure 500 may be any existing jet structure, and the jet outlet may be set to be a plurality of spaced small jet holes or a single opening. Preferably, the nozzle structure 500 adopts the above-mentioned nozzle structure 500 in embodiment 1.

In the present embodiment, the window pad 400 is a circle of annular structure extending along a circumferential direction of the opening of the outer drum 200; and the nozzle structure 500 is disposed on the top of the annular window pad 400, so that the additive solution jetted by the nozzle structure 500 can be jetted for a distance which is long as much as possible, and then, the coverage area of the additive solution is increased. In the present embodiment, the jet pipe 51 of the nozzle structure 500 passes through the window pad 400, the spray head 52 is located on the inner circumferential side of the annular window pad 400, and an axis of the jet pipe 51 is obliquely disposed downwards and towards one side inside the inner drum 300 of the washing machine. Preferably, an extension line of the axis of the jet pipe 51 intersects with an inner drum bottom of the inner drum 300 or a lower end, close to the inner drum bottom, of a side wall of the inner drum, so that the jet coverage area of the nozzle structure is maximized.

In the present embodiment, the axis of the jet pipe 51 and an axis of the inner drum 300 are located on the same plane, so that the nozzle structure 500 is located on a central position in a horizontal direction of the inner drum 300, and then, it is ensured that the nozzle structure 500 can uniformly jet the additive solution to left and right sides inside the inner drum 300 to improve the degree of contact between the load and the additive solution. Preferably, an included angle between the axis of the jet pipe 51 and the axis of the inner drum 300 of the washing machine is 20 DEG to 60 DEG, so that the coverage area of the additive area jetted by the nozzle structure is increased to the maximum extent.

In the present embodiment, the washing machine is internally provided with a guide pipe 600 which is disposed alone and is located outside the housing of the additive delivery device 100 and outside the outer drum 200, and two ends of the guide pipe 600 respectively communicate with the inlet of the nozzle structure 500 and the outlet 11 of the water supply waterway 1 by opposite splicing, so that the additive solution supplied by the water supply waterway 1 can be directly guided to the nozzle structure 500 by the guide pipe 600 to achieve the effect of direct jet delivery to the inside of the inner drum 300 of the washing machine. Preferably, the above-mentioned guide pipe 600 is made of a material such as rubber and is bendable and deformable.

In the present disclosure, the washing machine is provided with the above-mentioned additive delivery device 100, so that the additives in the washing machine directly flow to the nozzle structure 500 by the water supply waterway 1 and are directly jetted into the inner drum 300 by the nozzle structure 500, then, the additives in the washing machine directly flow into the inner drum 300 by the waterway of the delivery device 100 and are jetted to the to-be-treated load without passing through a water box and the outer drum 200 outside the inner drum 300, and then, the purpose of directly jetting the additive solution onto the to-be-treated load in the inner drum 300 is achieved. At the same time, due to the above-mentioned arrangement, the washing machine provided with the above-mentioned additive delivery device 100 can achieve the purpose that the additive solution formed by mixing the additives with a small deal of inlet water in the water supply waterway 1 is directly jetted onto the to-be-treated load in the inner drum 300, and then, the utilization ratio of the delivered additives is significantly increased.

In the embodiment of the present disclosure, the nozzle structure 500 may also be disposed on the housing, and/or the door body, and/or the outer drum 200, and/or the window pad 400 of the washing machine, the jet outlet of the nozzle structure 500 is disposed towards the inside of the inner drum 300, and the additives jetted by the nozzle structure 500 are directly jetted into the inner drum 300.

The above descriptions are merely preferred embodiments of the present disclosure, rather than limitations on the present disclosure in any form. Although the preferred embodiments of the present disclosure have been disclosed as above, they are not intended to limit the present disclosure. Those skilled in the art can alter or modify the embodiments by virtue of the above-mentioned technical contents without departing from the scope of the technical solutions of the present disclosure to obtain equally-changed equivalent embodiments. However, any simple alterations, equivalent changes and modifications made, without departing from contents of technical solutions of the present disclosure, for the above-mentioned embodiments according to the technical essence of the present disclosure still fall into the scope of the solutions of the present disclosure.

The invention claimed is:

1. An additive delivery device, comprising a water supply waterway; and a delivery unit configured to deliver additives to the water supply waterway; wherein: an outlet of the water supply waterway is connected to a nozzle structure, the delivery unit includes liquid storage cavities for storing the additives, and the liquid storage cavities communicate with the water supply waterway;

the water supply waterway is integrated on a housing of the delivery device, the outlet of the water supply waterway is disposed on an outer side of the housing, the nozzle structure is disposed outside the housing, and the outlet of the water supply waterway communicates with the nozzle structure by a guide pipe;

a top of the housing of the delivery device is an upper cover, the water supply waterway is disposed inside the upper cover, and the outlet of the water supply waterway is exposed on an outer circumferential side of the upper cover; and an independent guide pipe is disposed outside the housing, an inlet end of the guide pipe communicates with the outlet of the water supply waterway, and an outlet end of the guide pipe communicates with the nozzle structure disposed outside the housing.

2. The additive delivery device according to claim 1, wherein the nozzle structure comprises a jet pipe, wherein an outlet end of the jet pipe is provided with a spray head, the spray head is provided with a jet outlet, and a flow channel by which water in the jet pipe is guided to the jet outlet and a tangential acceleration of a water flow at the jet outlet is increased is disposed in the spray head.

3. The additive delivery device according to claim 2, wherein a water outlet cavity is disposed in the spray head, a water outlet end of the jet pipe is provided with a connector outwards protruding and correspondingly inserted into the water outlet cavity, a gap forming the flow channel is formed between an outer wall of the connector and an inner wall of the water outlet cavity, and the flow channel is connected to the jet pipe by the connector and also directly communicates with the jet outlet.

4. The additive delivery device according to claim 3, wherein an insertion end of the connector is closed, an other end of the connector communicates with the jet pipe, an outer side wall and the closed end of the connector are spaced from the inner wall of the water outlet cavity, the flow channel is formed on a spacing position, and a side wall, close to the closed end, of the connector is provided with a water hole, the water hole communicates a passage inside the connector with the flow channel.

5. The additive delivery device according to claim 4, wherein a pipe diameter of an inner circumference of the jet pipe is larger than an internal diameter of the connector, the internal diameter of the connector is larger than a width of the water hole, and the width of the water hole is larger than a width of the flow channel.

6. The additive delivery device according to claim 3, wherein the spray head comprises an end cover, and the jet outlet is formed in a center of the end cover; an outer circumference of the end cover is provided with a circle of annular folding edge bent to the jet pipe and extending along an axial direction of the jet pipe, an extension end of the annular folding edge is connected to the water outlet end of the jet pipe in a sealing way, and the water outlet cavity is formed inside the annular folding edge.

7. The additive delivery device according to claim 6, wherein the outlet end of the jet pipe is provided with the connector correspondingly inserted into the water outlet cavity, and the connector and the jet pipe are coaxially disposed; a radial size of an outer circumference of the connector is larger than a pipe diameter of the outlet end of the jet pipe and is smaller than a diameter of an inner circumference of the annular folding edge, and a radial size of an inner circumference of the connector is smaller than the pipe diameter of the outlet end of the jet pipe.

8. The additive delivery device according to claim 1, wherein the delivery device is further provided with a power unit supplying power for pumping the additives in the liquid storage cavities into the water supply waterway.

9. The additive delivery device according to claim 8, wherein the power unit is a pump disposed on a flow channel connecting the liquid storage cavities to the water supply waterway and supplies a driving force for a liquid in the flow channel to flow from the liquid storage cavities to the water supply waterway;

and/or, the power unit is a suction pump, and a suction hole of the suction pump communicates with the water supply waterway, a negative pressure is formed in the water supply waterway to pump the additives in the liquid storage cavities into the water supply waterway by the flow channel;

and/or, the power unit is a Venturi pipe disposed on the water supply waterway, the Venturi pipe is provided with a negative pressure region where the negative pressure is formable by virtue of a water flow flowing through the region, and a suction hole communicating with the liquid storage cavities by the flow channel is formed in the negative pressure region.

10. The additive delivery device according to claim 8, comprising the plurality of liquid storage cavities, and the delivery device being provided with a control device controlling one or a combination of the liquid storage cavities to communicate with the water supply waterway.

11. The additive delivery device according to claim 1, wherein a liquid storage box is disposed in the housing of the delivery device, at least one liquid storage cavity for storing the additives is disposed in the liquid storage box, and the liquid storage cavities in the liquid storage box respectively communicate with the water supply waterway.

12. The additive delivery device according to claim 1, wherein the water supply waterway is provided with a liquid suction hole communicating with the delivery unit and allowing the additives to enter, and the liquid suction hole is disposed close to an inlet of the water supply waterway.

13. A washing machine, comprising an inner drum configured to hold a to-be-treated load, and further comprising the additive delivery device of claim 1, an inlet of the water supply waterway of the additive delivery device communicating with a water inlet pipe of the washing machine, and the nozzle structure of the additive delivery device jetting towards the inner drum of the washing machine.

14. The washing machine according to claim 13, wherein the nozzle structure is disposed on a housing, and/or a door body, and/or an outer drum, and/or a window pad of the washing machine, and the jet outlet of the nozzle structure is disposed towards inside of the inner drum.

15. The washing machine according to claim 13, wherein the nozzle structure is mounted in an opening of the inner drum, and the jet outlet of the nozzle structure is disposed towards the inside of the inner drum.

16. The washing machine according to claim 15, wherein the inner drum is arranged in an outer drum, the outer drum and the inner drum are coaxially disposed and are provided with openings in the same side, and the opening of the outer drum is connected with a window pad protruding and extending towards outside of the drum; and the nozzle structure is disposed on the window pad, a jet pipe of the nozzle structure passes through the window pad, the spray head is located on an inner circumferential side of the window pad, and an axis of the jet pipe is obliquely disposed downwards and towards one side inside the inner drum of the washing machine.

17. The washing machine according to claim 16, wherein the nozzle structure is disposed on a topmost of the annular window pad; and an axis of the jet pipe and an axis of the inner drum are located on a same plane.

* * * * *